UNITED STATES PATENT OFFICE.

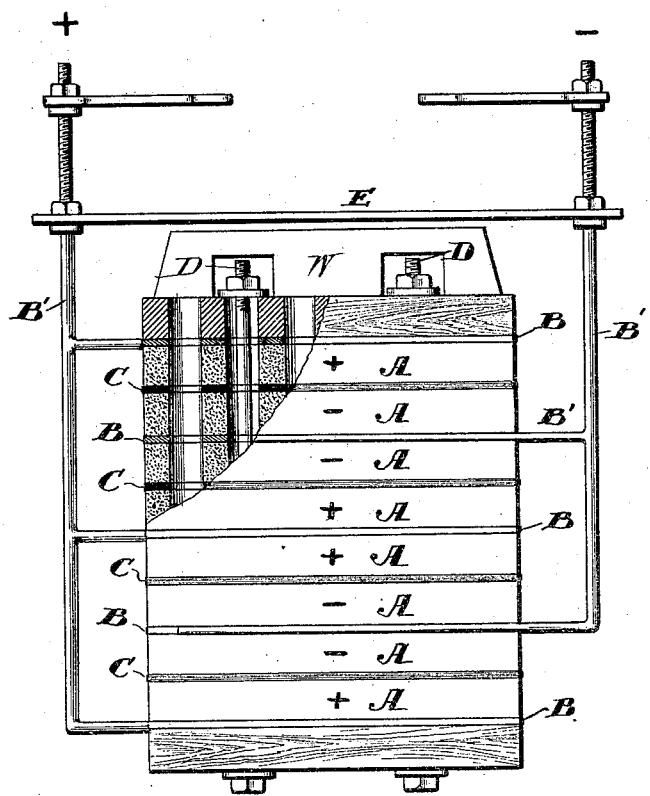

CARL HERING, OF PHILADELPHIA, PENNSYLVANIA.

SECONDARY BATTERY.

SPECIFICATION forming part of Letters Patent No. 429,914, dated June 10, 1890.

Application filed April 15, 1890. Serial No. 347,944. (No model.)

*To all whom it may concern:*

Be it known that I, CARL HERING, a citizen of the United States of America, residing at Philadelphia, in the county of Philadelphia and State of Pennsylvania, have invented certain new and useful Improvements in Secondary Batteries, of which the following is a specification, reference being had therein to the accompanying drawing.

My invention relates to the construction of a secondary battery or accumulator; and it consists in piling in a cell plates of active material, conducting-sheets, and non-conducting sheets placed horizontally one directly upon the other in regular series, and in producing a more perfect contact between such plates and conducting-sheets by a superimposed weight or a vertically-operating clamp.

Referring to the accompanying drawing, A A are plates of active material.

B B are conducting-sheets, to which are attached rheophores B'.

C C are non-conducting sheets.

D D are bolts clamping together the pile.

E is the lid of the cell.

The plates of active material are made in the form of slabs of oxides or salts of lead agglutinated into a firm homogeneous and coherent mass by their own adhesion or by the use of a cement.

The conducting-sheets are of lead or other conducting material, and the non-conducting sheets are of material pervious or impervious to moisture, as desired; but if of impervious material they are perforated to admit moisture and to allow action between the plates.

The plates and sheets are laid horizontally when in service, and are so piled in contact with one another that a conducting-sheet is in contact with each plate of active material and a non-conducting sheet is between each two adjacent plates of different polarity, whether plates of different polarity be piled singly, each with a conducting-sheet, or plates of similar polarity in pairs with a conducting-sheet between two plates. The pile simply so constructed forms an efficient battery; but for increase of efficiency by more perfect contact between plates and conducting-sheets a weight may be superimposed; or preferably, and also for better convenience in transportation, the pile may be clamped together vertically.

I claim as my invention—

1. An accumulator consisting of a pile of plates of active material, conducting-sheets, and non-conducting sheets placed horizontally and serially superimposed and juxtaposed.

2. An accumulator consisting of a pile of plates of active material, conducting-sheets, and non-conducting sheets placed horizontally and serially superimposed and juxtaposed and clamped together vertically.

In testimony whereof I have affixed my signature in presence of two witnesses.

CARL HERING.

Witnesses:
GEORGE HOUSE,
G. MORGAN ELDRIDGE.